United States Patent [19]
Orme et al.

[11] 4,047,540
[45] Sept. 13, 1977

[54] MULTI-PATH VALVE STRUCTURE HAVING EXTENDED LIFE AND BACKWASHING CAPABILITY

[75] Inventors: Myrl E. Orme, Canoga Park; Ralph L. Vick, Granada Hills, both of Calif.

[73] Assignee: The Bendix Corporation, North Hollywood, Calif.

[21] Appl. No.: 644,393

[22] Filed: Dec. 29, 1975

[51] Int. Cl.² .................. F16K 47/08; F15B 13/04
[52] U.S. Cl. .................. 137/239; 137/625.3; 137/625.69; 251/127
[58] Field of Search ........... 137/625.3, 625.69, 239; 251/127

[56] References Cited
U.S. PATENT DOCUMENTS
3,899,001  8/1975  Orme ........................ 137/625.3

Primary Examiner—Alan Cohan
Assistant Examiner—Gerald A. Michalsky
Attorney, Agent, or Firm—Robert C. Smith; William F. Thornton

[57] ABSTRACT

Multiple path means for a fluid flow control device is shown in connection with a typical spool type servo valve. The multiple path means consists of a stack of washer-like elements or disks which cooperate to define a number of finely divided flow paths across the stack in which flow is forced through a series of alternating chambers and orifices with measured pressure drops across the orifices. Since many servo valves have comparatively short travel and since both control and wear problems tend to be most serious near null, it is desirable to minimize abrupt step flow gains around null.

In the present disclosure individual disks, at least at the ends of the stack, are made comparatively thin such that the thickness of two or more disks may be required to provide a normal opening width into the stack. Thus a first disk and a second disk may have openings at the inside edge which register at identical positions to admit flow into the stack with the second disk also having a second opening or set of openings at another position on its inside edge so that as the spool valve land passes the second disk, it completes opening the first set of openings and begins exposing the second set of openings into the stack, etc. In this way the flow vs. displacement characteristic of the valve may provide flow which is quite limited near null and yet increases quite smoothly since a new increment of flow into the stack may be added at every disk width rather than at the width of each opening or set of openings. Flow is preferably initially curtailed by being forced through a set of small series orifices only during a first increment of displacement after which larger openings are exposed in parallel to the orifices, thus permitting an accelerated flow. The flow vs. displacement characteristic may be tailored substantially as desired through arranging of the disks to provide lesser or greater flows into the stack at each disk position. Backflushing flow patterns are included such that, for an initial movement off null in either direction, only a limited flow is permitted, and for the next increment of flow a parallel passage is exposed which conducts fluid across the opposite side of the stack in a direction opposite to its normal flow, thus backflushing the orifices in that side.

13 Claims, 23 Drawing Figures

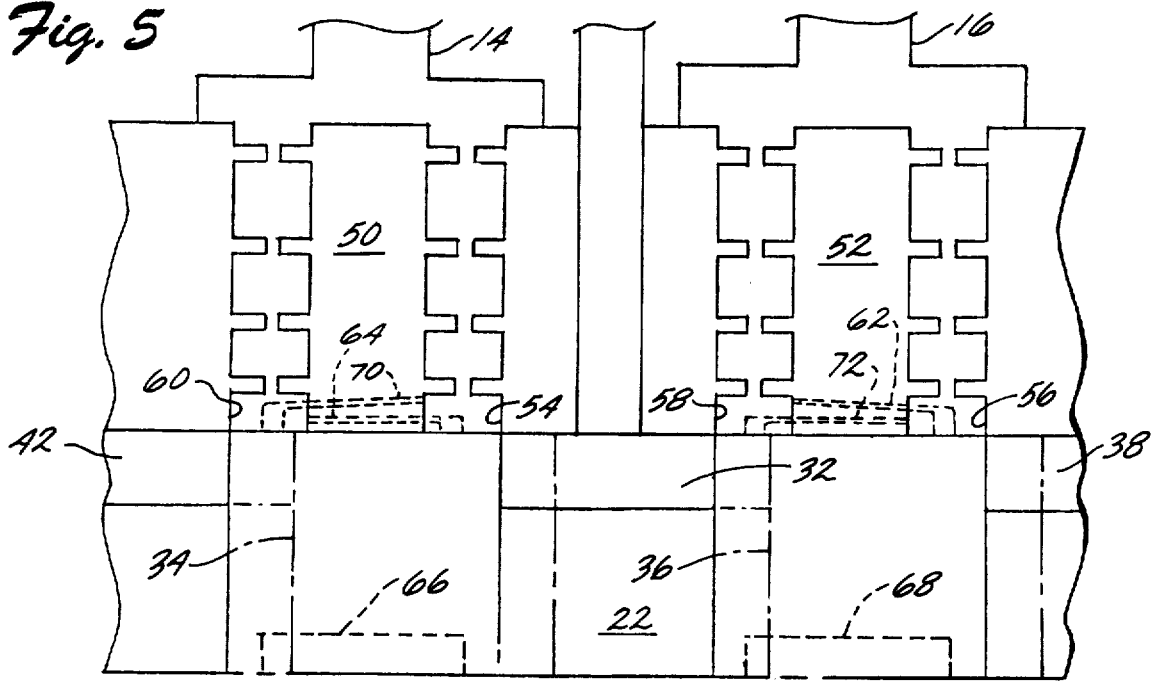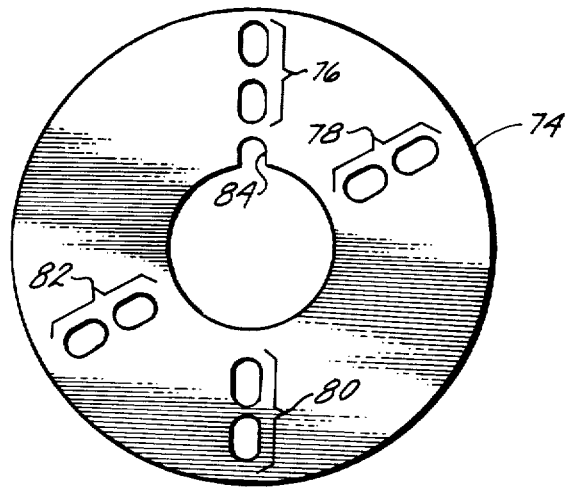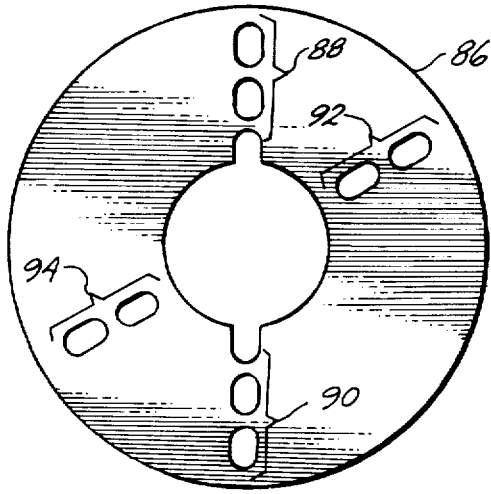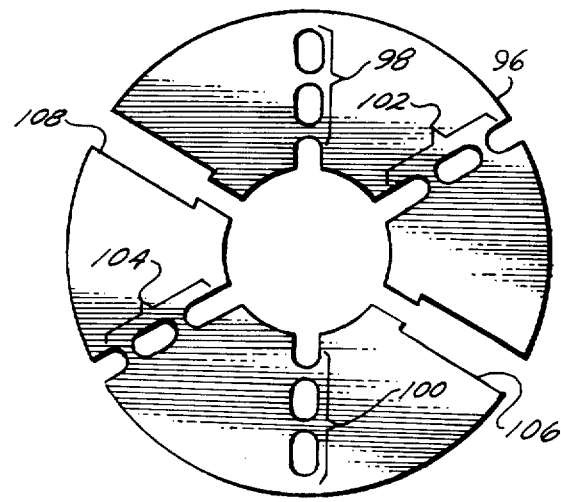

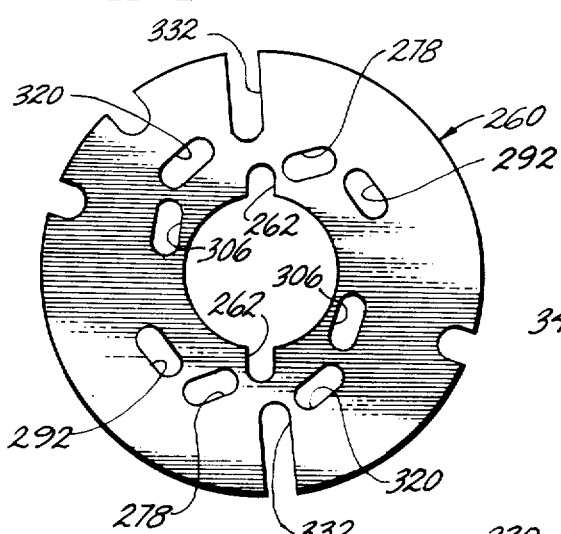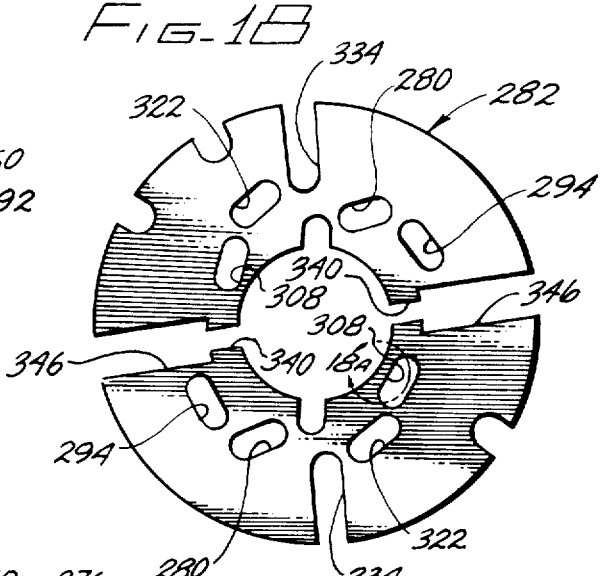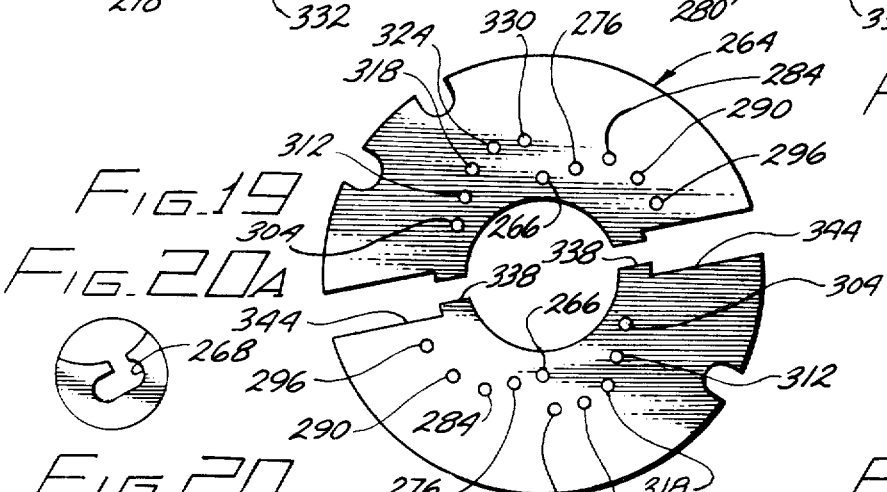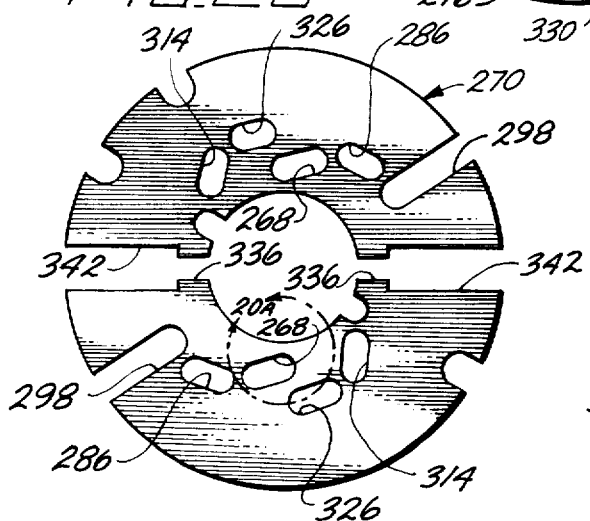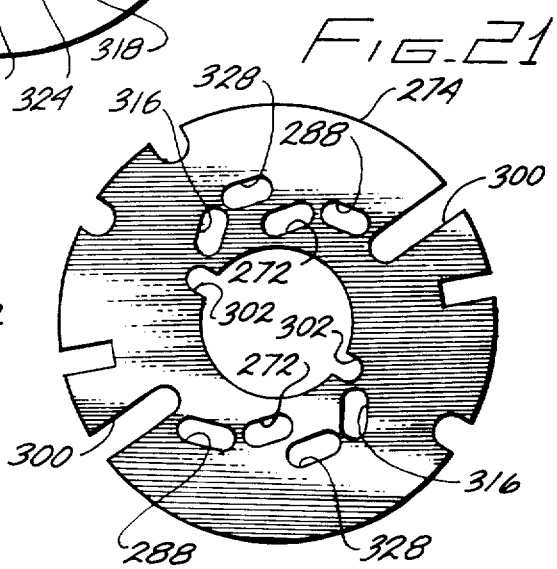

MULTI-PATH VALVE STRUCTURE HAVING EXTENDED LIFE AND BACKWASHING CAPABILITY

CROSS-REFERENCE TO RELATED APPLICATION

United States patent application Ser. No. 528,177 to Ralph L. Vick filed Nov. 29, 1974 (common assignee) now abandoned.

BACKGROUND OF THE INVENTION

In many flow control applications there is a need for structures which can vary the fluid-flow rate of flowing fluids without the production of excessive wear, noise or vibration. The term "throttling" is generally applied to the function of altering or adjusting fluid flow throughout a range of flow rates. The various structures by which the function is performed are generally called "throttling valves" to distinguish them from structures whose function is to open and close a flow path as a step function. To the extent that on-off valves are not opened and closed instantaneously, so that throttling noise and vibration may be produced therein at the time of opening or closure, the invention described herein is applicable to such valves as well, and they are included in the term "throttling valve".

A typical control valve for handling the flowing of high pressure fluids employs a structure in which the cross-sectional area of the flow path is altered. This type of structure generally produces substantial noise and vibration and is quite subject to damage from cavitation. However, the structures employed in this arrangement are, as a class, least expensive and most conveniently employed. The conventional spooltype hydraulic servo valve is typical of this type of valve.

Hydraulic systems of commercial aircraft usually employ phosphate-ester-based hydraulic fluids because of their fire-resistant properties. These fluids, however, have been found to be extremely erosive in the throttling or metering control valves of these systems. In effect, they induce an electrochemical milling action on the valve metering edges which is quite apart from the normal wear associated with fluid flow. Improvements have been made in the fluids, and various attempts at valve design changes have effected some gains; however, the problem remains a severe one with valves surviving from only a very few hours to an acceptable life, but still far below that of valves that work in most other fluid systems. The phenomena is characteristic of other fluids; however, the severity with which it occurs in hydraulic systems using phosphate-ester-based fluids is particularly unique.

In systems using phosphate-ester-based fluids, one of the most erosive conditions extant can be found on valves which are underlapped (or have zero lap) and remain at null or near null for long periods of time. The configurations involved include flight control system valves, spoiler control system valves, flap control valves (which are modulating types), relief valves that have continuous low leakage or erode to that condition, and other valves that are high differential pressure-throttling configurations with continuous "built-in" or "eroded to" flow conditions. Once flow is established and the "electrochemical milling" beings, the erosion is usually continuous until the leakage rate of the valve is no longer tolerable.

Many structures have been devised in an attempt to deal with the damage resulting from operation of valves in high pressure systems. Most of these have involved some form of baffling means which operate in one way or another to divide the flow and cause the pressure drops to be taken at various locations rather than across a single metering edge. One such arrangement is described in the copending application of Ralph L. Vick, referred to above, in which flow is divided into fine streams by a series of stacked disks surrounding a spool valve and in which each small stream is caused to flow into a chamber, from thence across an orifice to another chamber, reversing direction through another orifice, etc., radially across the disks. In this arrangement the pressure drops across the disks are essentially those caused by the orifices in series. One problem which has been of some concern with this arrangement is that the orifices may become plugged or obstructed to some degree through contamination. This, of course, will degrade performance of the valve, and if one or more orifices become entirely plugged, a "dead band" will be introduced accompanied by abrupt flow increases after the spool valve land passes the dead band position. For many applications this kind of flow pattern is highly undesirable from the standpoint of control and may introduce further wear and erosion of the valve.

DESCRIPTION OF THE DRAWINGS

FIG. 5 is a schematic view of an assembly like that in FIG. 2 with the spool displaced to a fourth position;

FIG. 6 is a plan view of a first type of disk which may be used in the valve at FIG. 1;

FIG. 7 is a plan view of a second type of disk which may be used in the valve of FIG. 1;

FIG. 8 is a plan view of a third type of disk which may be used in the valve of FIG. 1;

FIGS. 17–21 represent an additional embodiment of our invention involving a somewhat different disk pattern in which:

FIG. 17 is a plan view of a first disk which may be used in the valve of FIG. 1;

FIG. 18 is a plan view of a second disk which may be used in the valve of FIG. 1;

FIG. 18A is an enlarged view of a portion of FIG. 11 showing an alternate embodiment.

FIG. 19 is a plan view of a third disk which may be used in the valve of FIG. 1;

FIG. 20 is a plan view of a fourth disk which may be used in the valve of FIG. 1;

FIG. 20A is an enlarged view of a portion of FIG. 13 showing an alternate embodiment.

FIG. 21 is a plan view of a fifth disk which may be used in the valve of FIG. 1.

DESCRIPTION OF THE PREFERRED EMBODIMENT

Figure 1:
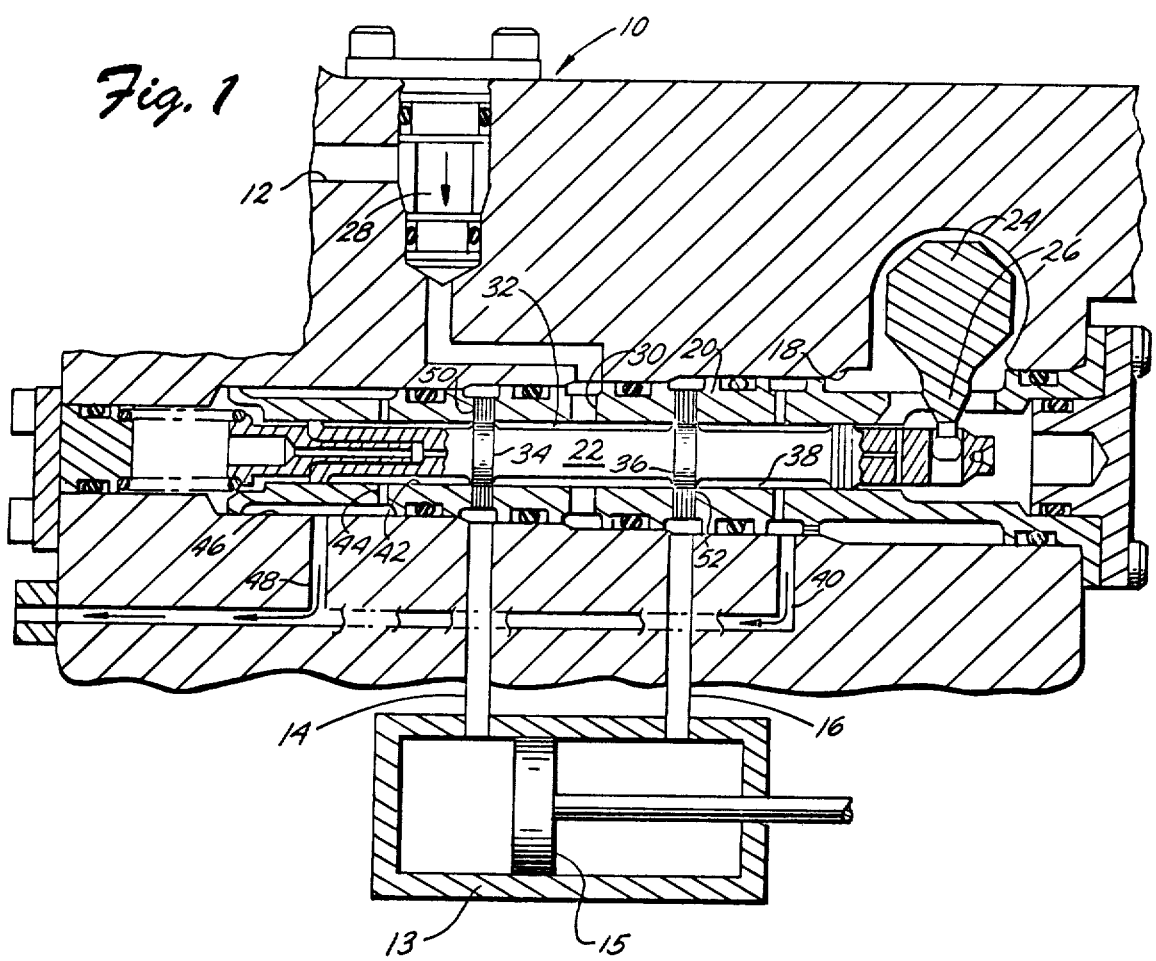
FIG. 1 is a cross-sectional view of a typical spool-type servo valve using our invention.

A flow control valve is shown generally at numeral 10 whose purpose is to control flow to an external utilization device such as a cylinder. Fluid from a source, not shown, is applied to an inlet passage 12, and flow from the valve member 10 is provided to an actuating cylinder 13 through outlet conduits 14 and 16 connected to opposite sides of a piston 15. Positioned within valve 10 is a generally cylindrical chamber 18 having a plurality of different diameters. The stationary sleeve member 20, having a plurality of matching diameters, is positioned in chamber 18. Axially movable within the sleeve 20 is a spool valve 22 which is directly driven mechanically by means of a rotatable control member 24 having an extendible arm 26 engaging the spool member 22.

Fluid flow entering inlet passage 12 passes a conventional check valve 28 and flows through an orifice or series of orifices 30 which are radially positioned through the side wall of sleeve member 20 to provide communication to a chamber 32. Defining the ends of chamber 32 are a pair of lands 34 and 36 movable axially with spool valve member 22 in such manner as to direct high pressure inlet fluid from chamber 32 into either of cylinder passages 14 or 16. When spool member 22 has moved toward the left, land 34 is similarly displaced, thus opening communication between chamber 32 and passage 14. At the same time, land 36 also moves to the left, opening communication between passage 16 and a chamber 38 which communicates with return pressure through a line 40. This results in movement of piston 15 toward the right. Movement of the spool 22 in the opposite direction results in connecting high pressure fluid from chamber 32 to line 16 and permitting fluid on the left side of the cylinder 15 to be exhausted through passageway 14 into a chamber 42 which communicates with return conduit 40 through a line 44, a chamber 46 and a passageway 48, and causing piston 15 to be moved toward the left.

Surrounding each of lands 34 and 36 are stacks of disks 50 and 52, respectively, which are stacked in a face-to-face relationship and which include patterns of openings and orifices which divide the flow into a number of flow paths for minimizing wear, noise and/or erosion damage to the valve which might otherwise result because of the high pressure differentials employed. It will be observed that with the particular valve configuration shown, flow may be directed across the disks either from inside to outside or from outside to inside, depending upon which set of disks is considered and which direction the spool 22 is moved. Because of the smaller effective area on the internal diameter, it is frequently important in this type of valve that the flow versus displacement relationship be reasonably smooth and that abrupt changes do not occur as the spool is moved across one disk element and then another.

Figure 2:
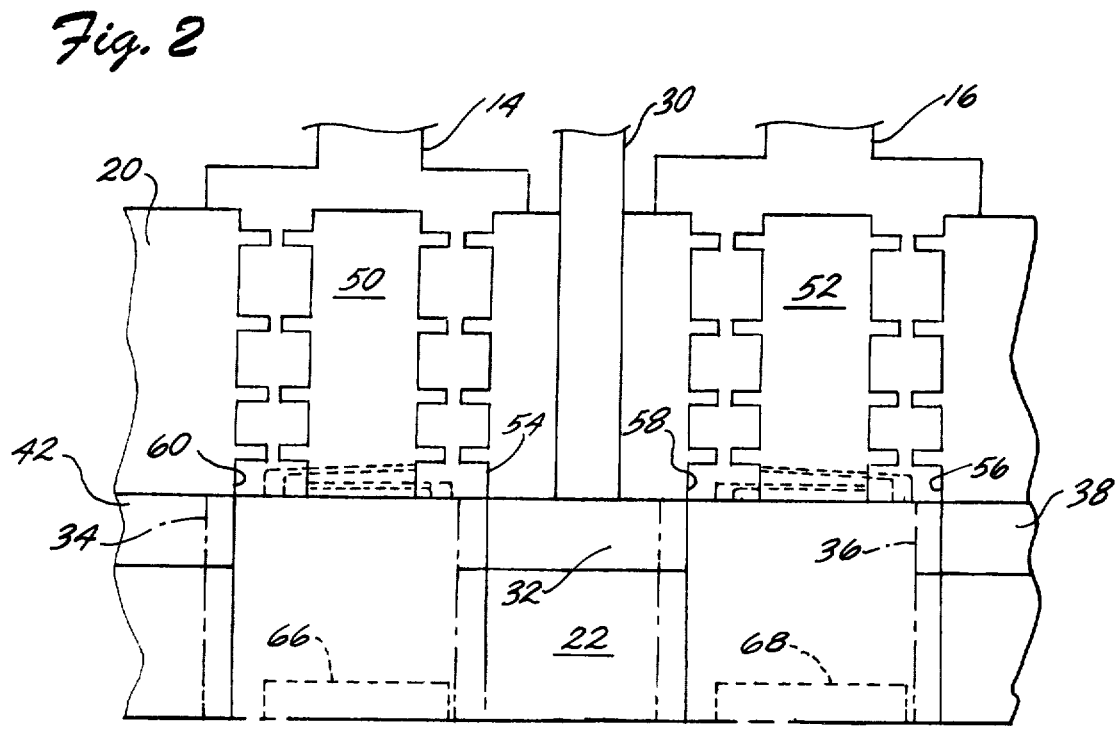
FIG. 2 is a schematic view of a spool and sleeve assembly like that of FIG. 1 with the spool displaced to a first position.

The present application is concerned with a means for avoiding problems which may develop in operation of a valve such as that shown in FIG. 1 from plugging or obstruction of the flow-limiting orifices. Since the actual disk patterns and configurations may be subject to wide variations, applicants will first describe his invention conceptually in connection with schematic drawings 2–5 and subsequently will describe a pattern of disks which perform according to the concept. In FIG. 2 only that portion of the spool member 22 above the center line is shown along with lands 34 and 36 which are shown in phantom displaced slightly toward the left from the null position. High pressure operating fluid entering passage 30 and chamber 32 now communicates with an open chamber 54 on the right edge of stack 50 from whence it passes through the series of orifices and chambers shown at the right side of stack 50 to passageway 14. Concurrently, flow from passageway 16 flows through the chambers and orifices on the right side of stack 52 and from thence into a disk chamber 56 and return chamber 38.

Figure 3:
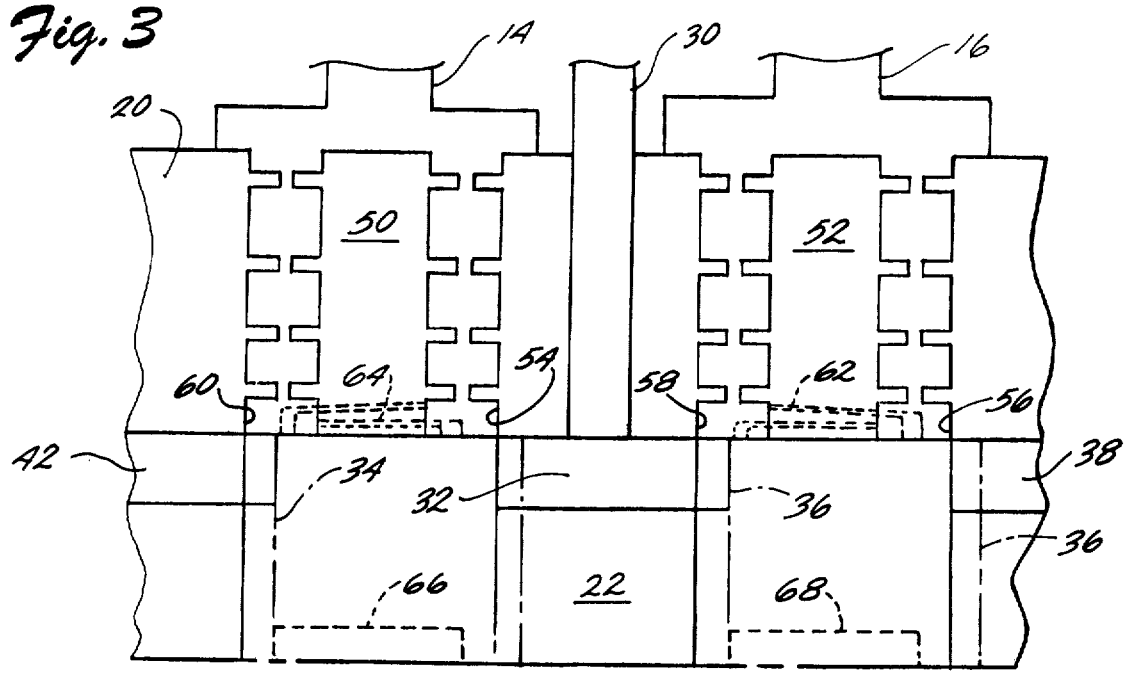
FIG. 3 is a schematic view of an assembly like that in FIG. 2 with the spool displaced to a second position.

FIG. 3 is a schematic figure like FIG. 2 except that the spool 22 and lands 34 and 36 are shown displaced a small distance toward the right. This permits high pressure fluid in chamber 32 to be communicated with a chamber 58 on the left side of stack 52, from thence through the adjoining orifices and chambers and out of passageway 16. At this time flow is also returning from the cylinder through passageway 14, across the series of orifices and chambers on the left side of stack 50 to a disk chamber 60 and to return chamber 42. Thus operation is in all respects analogous to that described in connection with FIG. 2.

Figure 4:
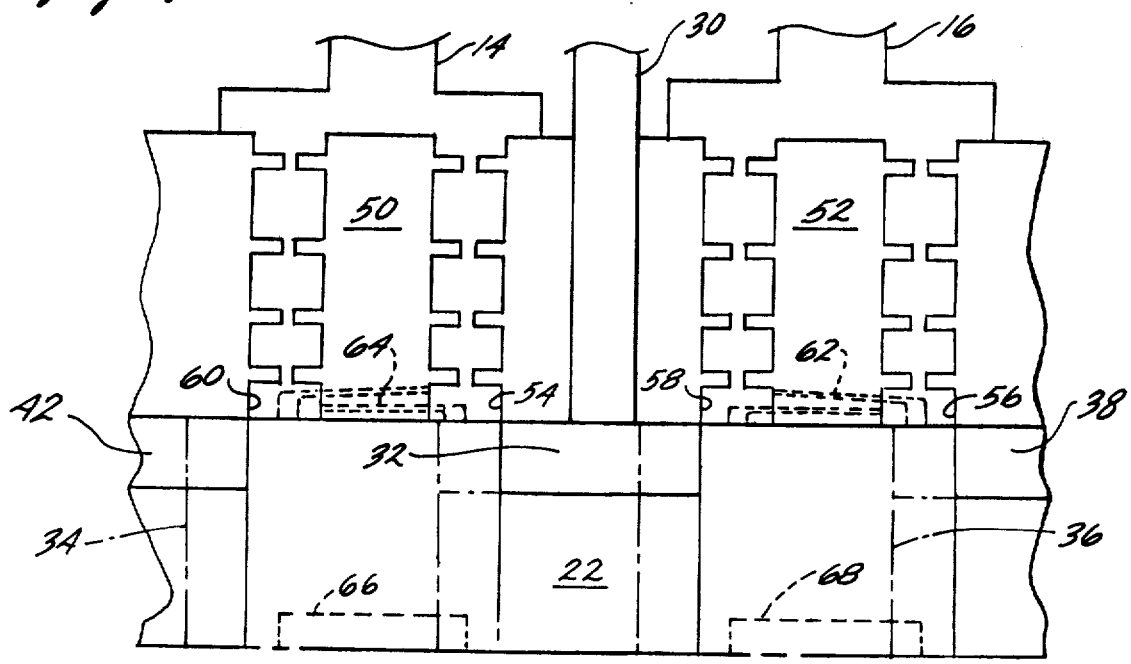
FIG. 4 is a schematic view of an assembly like that in FIG. 2 with the spool displaced to a third position.
Figure 15:
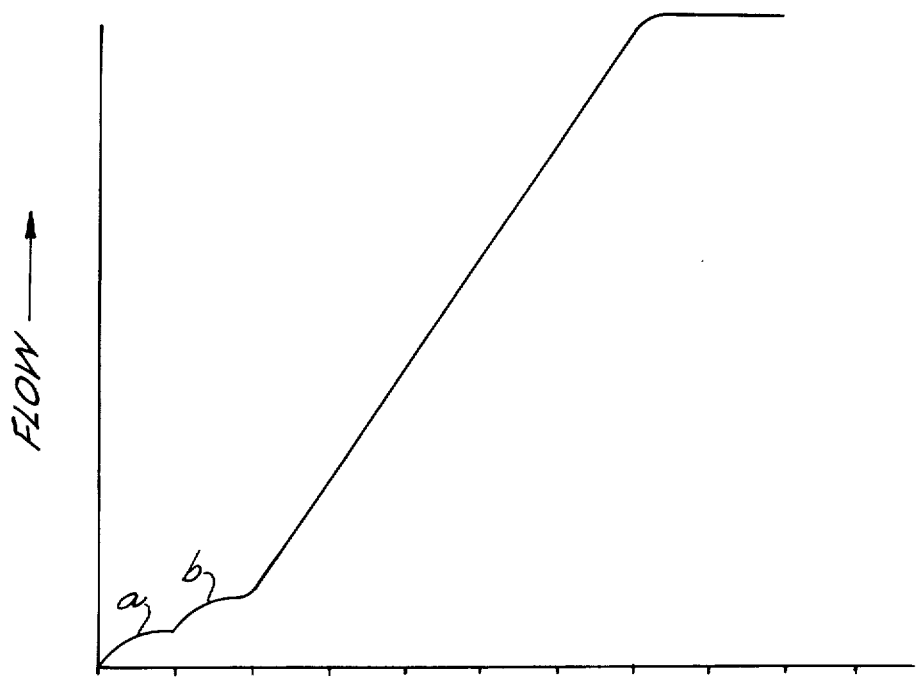
FIG. 15 is a graph showing the relationship of flow vs. displacement of a valve such as that of FIG. 1 wherein the disks of FIGS. 6–14 are used.

FIG. 4 is also a schematic drawing like that of FIGS. 2 and 3 except that in FIG. 4 the spool 22 and lands 34 and 36 are displaced a somewhat greater distance toward the left than in FIG. 2. This results in the same flow pattern into chamber 54 and the orifices and chambers associated therewith and out of passageway 14 as described above with respect to FIG. 2 and also the same return flow pattern from conduit 16 down the orifices and chambers on the right side of stack 52, out of chamber 56 to return chamber 38. In addition, the greater displacement of the lands 34 and 36 opens additional passageways 62 and 64 in stacks 52 and 50, respectively, which communicate with chambers 58 and 60, respectively, thereby opening flow paths parallel to those previously established. Thus the high pressure fluid from chamber 32, in addition to entering chamber 54, also enters passage 64 from whence it flows into chamber 60 and through the series of orifices and chambers associated therewith in the opposite direction to the normal direction of flow previously described, thereby backflushing these orifices. Concurrently return flow from passage 16 flows through the orifices and chambers on both sides of stack 52, that flow reaching chamber 58 being connected to return chamber 38 through passage 62. The flow through the left side of the stack is in the opposite direction to the normal flow previously described and therefore serves to backflush the orifices on this side. FIGS. 2–5 also show large openings 66 and 68 in stacks 50 and 52, respectively, which provide a large flow area across the stacks as the lands 34 and 36 move past an initial increment in either direction from null. Reference to the graph, FIG. 15, shows that an initial movement of the lands produces a limited flow shown on the part of the curve labeled a, a subsequent small movement adds the increment labeled b, and further movement which opens passageways 66 and 68 provides a very steeply increasing flow with increasing stroke up to the point of saturation.

FIG. 5 is a schematic drawing very similar to FIG. 4 except that the lands 34 and 36 are moved toward the right a distance sufficient to open additional passageways 70 and 72 in stacks 50 and 52, respectively. This permits high pressure fluid in chamber 32 to communicate not only with chamber 58 as described, but also with passageway 72 which admits fluid to chamber 56 and from thence to its associated chambers and orifices. Again, the direction of flow is opposite to the normal direction through this structure with the result that the orifices associated with chamber 56 are backflushed, with this flow then combining with that flowing through the opposite side of stack 52 before entering passage 16. Return flow from passage 14 is also split, the normal flow entering the chambers and orifices associated with chamber 60 and a backflushing flow moving in the same direction through the chambers and orifices associated with chamber 54 and reaching the return chamber 42 through passageway 70.

FIGS. 6-14 are plan views of individual disks which comprise one of the stacks which function in the manner described above in connection with FIGS. 1-5. Thus, in a typical stack one each of the disks assembled in the order shown would be used to provide the desired operation. Many other patterns could be used depending upon the space available and the characteristics desired for the valve. If greater total pressure drops or smaller drops per orifice must be provided for, the patterns may be arranged to provide for more orifices in each path. From the teachings herein, it is believed that those skilled in the art will be able to provide valve structures accomplishing the objectives of longer life and a backflushing function for any of a wide range of applications.

FIG. 6 is a plan view of the first of a series of disks constituting a stack such as that shown at numerals 50 or 52 in any of the above figures. Disk 74 includes a first group of openings 76 arranged along a vertical line at what might be considered the 12 o'clock position. Displaced clockwise about 60° is a second group of openings 78 similar to those openings 76 but arranged on the disk such that, if they were rotated around to the position of openings 76, they would not register with these openings but would overlap. The purpose of this arrangement will be discussed below. Positioned vertically downwardly from openings 76 is a pair of openings 80 which are positioned relative to the center of the disk as are openings 78. A further group of disks 82 is rotated approximately 60° clockwise from openings 80, and this group is also positioned on the disk similarly to openings 78 and 80. A single opening 84 aligned with group 76 intersects the inside edge of disk 74.

FIG. 7 shows the second disk 86 in the stack, and it includes a first pattern of disks 88 at the 12 o'clock position which are identical in position and pattern to openings 76 and 84 of disk 74. Along the same vertical line at the six o'clock position is a set of openings 90 which are identical to the openings 88 and nonaligned with openings 80 of disk 74. Rotated 60° clockwise from openings 88 and 90 are sets of openings 92 and 94 which register with and are identical to openings 78 and 82 of disk 74.

The third disk 96 in the series is shown in FIG. 8. This disk includes sets of openings 98 and 100 at the 12 o'clock and six o'clock positions registering exactly with openings 88 and 90 of disk 86. Positioned approximately 60° clockwise from openings 98 and 100 are sets of openings 102 and 104 which include openings at the exterior and interior edges of disk 96, said latter openings being substantially deeper than the openings in groups 98 and 100. Positioned an additional 60° clockwise from openings 102 and 104 are slots 106 and 108 which afford direct communication across the disk from outside to inside or the reverse. This disk and others showing such large slots are initially formed to larger diameters and trimmed to the size shown after the stack is brazed together. These slots perform the function shown in FIGS. 2-5 by slots 66 and 68.

Figure 9:
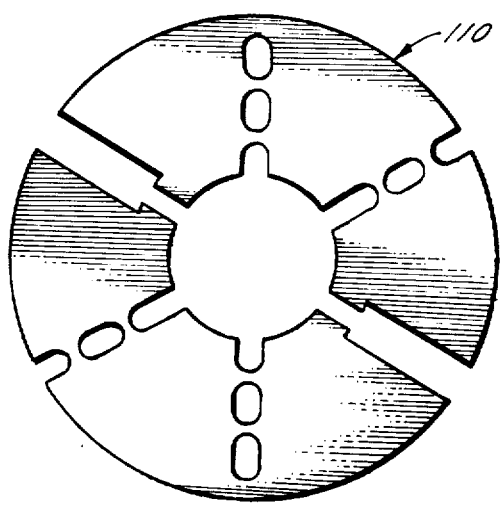
FIG. 9 is a plan view of a fourth type of disk which may be used in the valve of FIG. 1.
Figure 10:
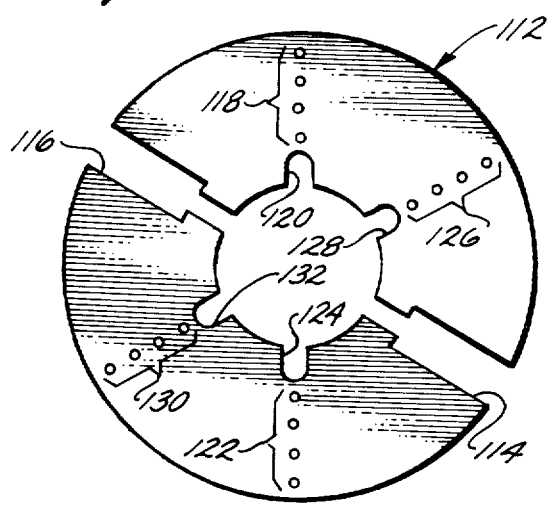
FIG. 10 is a plan view of a fifth type of disk which may be used in the valve of FIG. 1.

FIG. 9 shows a disk 110 which is positioned adjacent disk 96 and which includes patterns of openings identical to those shown in FIG. 8. Since disk 110 is positioned directly adjacent disk 96, all of the openings in these two disks will register exactly in use. FIG. 10 shows a disk 112 having slots 114 and 116 registering with slots 106 and 108 in disk 96 and the corresponding slots in disk 110. At the 12 o'clock position, disk 112 includes a plurality of small orifices 118 which extend radially across the disk as well as an opening 120 extending into the disk from the inside edge. A similar pattern of openings is shown at the 6 o'clock position comprising orifices 122 and opening 124. Rotated 60° clockwise from orifices 118 and opening 120 are orifices 126 and opening 128, and rotated 60° clockwise from openings 122 and 124 are orifices 130 and opening 132.

Figure 11:
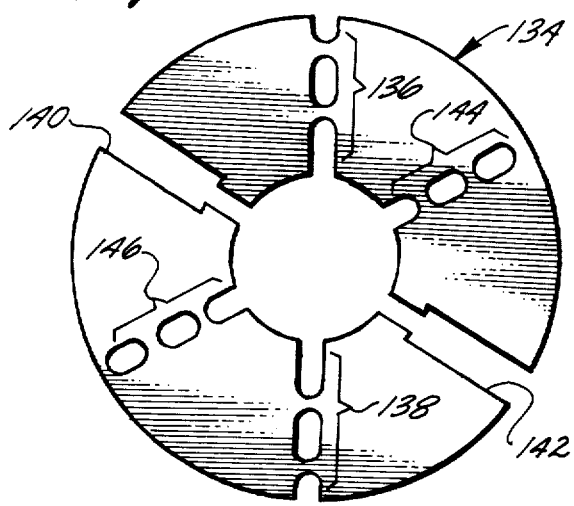
FIG. 11 is a plan view of a sixth type of disk which may be used in the valve of FIG. 1.
Figure 12:
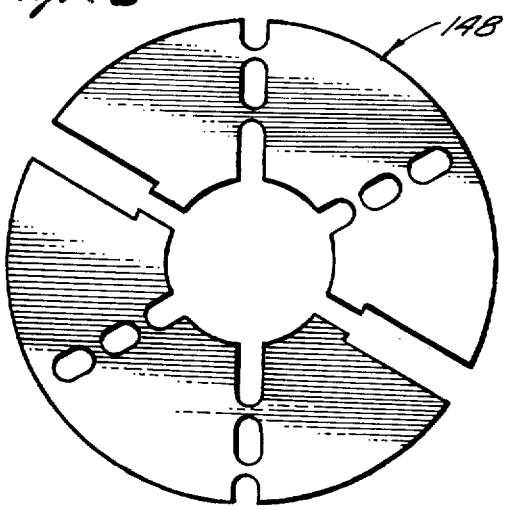
FIG. 12 is a plan view of a seventh type of disk which may be used in the valve of FIG. 1.

Disk 134 shown in FIG. 11 includes, at the 12 and 6 o'clock positions, sets of openings 136 and 138 which are the same pattern and which include openings on the exterior periphery of the disk as well as deep openings from the interior edge. Rotated counterclockwise 60° from these openings are a pair of slots 140 and 142 which are identical to and register with the slots previously described in FIGS. 8, 9 and 10. Positioned 60° clockwise from the vertical openings are sets off openings 144 and 146 which include a slot of the usual depth from the inside edge of the disk 134. Disk 148 shown in FIG. 12 is identical with disk 134, and this disk, of course, is positioned adjacent disk 134 in the stack.

Figure 13:
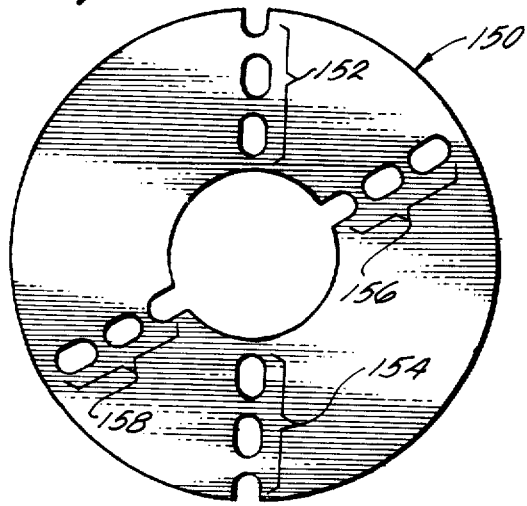
FIG. 13 is a plan view of an eighth type of disk which may be used in the valve of FIG. 1.

Disk 150 shown in FIG. 13 includes sets of openings 152 and 154 at the 12 and six o'clock positions which are identical and which include slots in the outside periphery of the disk. Rotated 60° clockwise from each of these sets of openings 156 and 158 which include slots in the inside edge of disk 150 as well as other openings which are nonaligned along a radius of the disk as compared with the openings 152 and 154.

Figure 14:
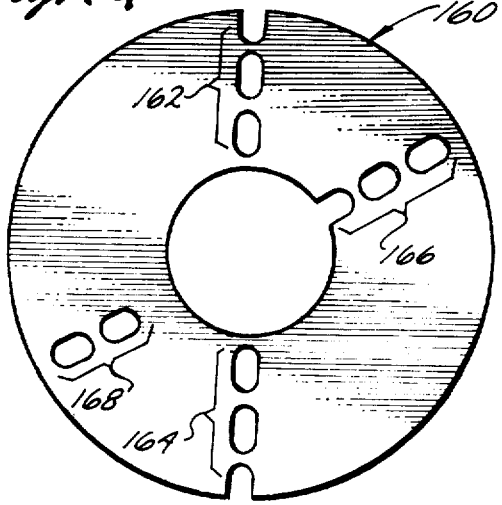
FIG. 14 is a plan view of a ninth type of disk which may be used in the valve of FIG. 1.

FIG. 14 shows the last disk 160 in this series having openings 162 and 164 which are identical to and register with openings 152 and 154 in disk 13. 60° clockwise from openings 162 and 164 are sets of openings 166 and 168. Openings 166 are identical to and register with openings 156 in disk 160 and include an opening at the inside edge of the disk. Openings 168 register with the two outside openings 158 in disk 150, but there is no corresponding opening at the inside edge of the disk.

Figure 16:
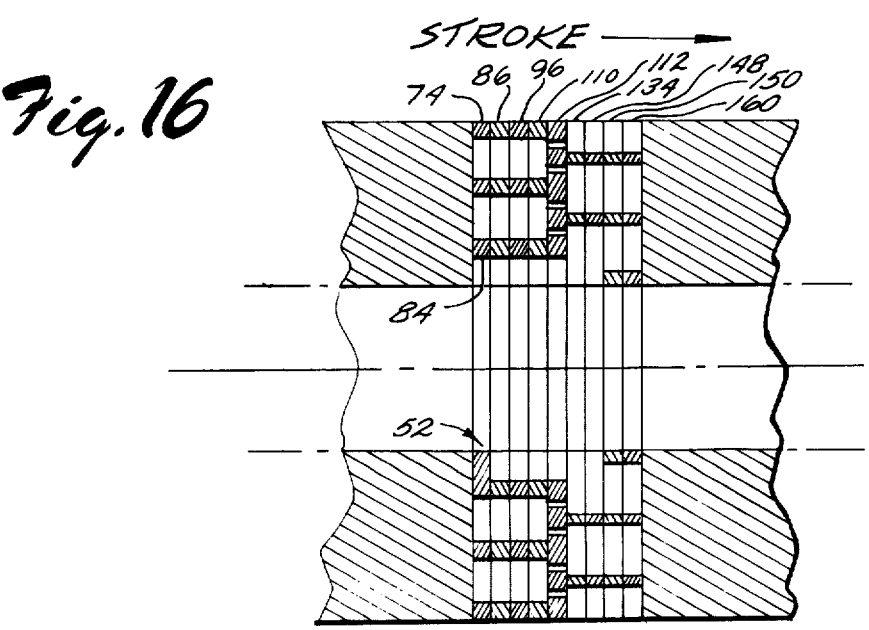
FIG. 16 is a sectional view through a stack of disks as shown in FIG. 1, including individual disks as shown in FIGS. 6 through 14.

In understanding the pattern of flow across a stack represented by disks 6-14, one needs to consider these disks as having finite thickness such as 0.005 inch and being arranged such that disk 86 is positioned adjacent disk 74, 96 adjacent disk 86, disk 110 adjacent disk 96, etc. FIG. 16 is a sectional view through such a stack 52 taken along a line running through the 12 o'clock and six o'clock positions. One must then consider the flow patterns resulting as the land of the spool valve progressively moves past disks 74, 86, 96, 110, etc. and also in the opposite direction moving past disk 160, then disk 150, then 148, etc. Initially it will be assumed that high pressure fluid is in the center of the disk adjacent the land. Flow enters as the land passes disk 74, thus exposing opening 84 to high pressure fluid. Flow entering opening 84 will move along the corresponding openings in disks 86, 96, 110 and 112 until it reaches the deep slot in the same position in disk 134 at which point fluid will come in contact with the inner of the orifices 118 in disk 112. Flowing through this orifice, it will enter a chamber defined by the center opening at the 12 o'clock position in disks 110, 96, 86 and 74, which combine to form a chamber of some significant volume communicating also with the second of orifices 118 in disk 112. This orifice communicates with a chamber formed by the center opening of openings 136 in disk 134 as well as registering openings at the 12 o'clock position in disks 148, 150 and 160. This series of openings form a chamber which communicates with the third (from the inside) orifice of orifices 118 thereby permitting flow across this orifice and into a chamber defined by the outside opening of the openings at the 12 o'clock position in disks 110, 96, 86 and 74. From this chamber the fluid may then flow through the outside of orifices 118, thereby entering the exit slot shown as the outside slot of openings 136 in disk 134 and the corresponding and registering exit slots in disks 148, 150 and 160. Thus, for the initial increment of opening the flow is severely restricted by being forced through the series of small orifices 118.

As the land moves past disk 86, it uncovers a further opening at the inside edge of group 88 registering with opening 84 but also exposes the inlet slot in group 90 which communicates with corresponding slots at the six o'clock position in disks 96, 110, 112 and elongated inlet slots in the group 138 of disk 134 and a corresponding slot in disk 148. These elongated slots provide communication with the inside of the series of orifices 122 in disk 112, thereby permitting communication with a chamber defined by the center openings at the six o'clock position in each of disks 110, 96, 86 and 74. Flow from this chamber then passes through the second of orifices 122 into a chamber defined by the center opening at the six o'clock position in disks 134, 148, 150 and 160. The reader will understand that this flow pattern now becomes identical to that previously described and results in flow leaving the stack at the external opening at the six o'clock position in disks 134, 148, 150 and 160.

Movement of the land sufficient to expose the inside edge surface of disk 96 adds an additional width of opening at the six o'clock position in the form of the inside opening of group 100, as well as exposing the large slots 106 and 108 which provide for a large flow from inside to outside of the stack. At the same time, flow is permitted to enter the deep inside openings of groups 102 and 104 displaced 60° clockwise from openings 98 and 100, which openings register with corresponding openings in disk 110, thereby providing communication with the inside orifice of the orifices 126 and 130 in orifice disk 112. These orifices communicate with chambers defined by the center opening of groups 144 and 146 in disk 134 and corresponding openings in disks 148, 150 and 160. Fluid moving to the outside edge of this of this opening will then communicate with the second of the orifices 126 and 130, crossing this orifice and entering into a chamber defined by the center openings at the corresponding positions in disk 110 and disks 96, 86 and 74. Flow reaching this chamber passes through the third of the openings 126 and 130 which communicates with the chambers formed by the outside of openings 144 and 146 in disk 134 and corresponding openings in disks 148, 150 and 160. Again, flow toward the outside of these chambers communicates with the outside orifices of orifices 126 and 130, thereby providing communication with the exit slots in disks 96 and 110. It is this flow pattern which backwashes orifices 126 and 130 when the flow is in this direction. Movement of the land past disk 110 opens additional flow into the large slots which correspond with slots 106 and 108 of disk 96, and this provides for substantial increase of overall flow, although there is essentially no additional flow across the orifice paths described above. Further movement past disks 112, 134 and 148 adds substantial increments at each disk to the flow area available through the large slot shown in each of these disks, and this flow becomes essentially saturated as the land passes disk 148. Further stroke past disks 150 and 160 provides no additional flow since the flow from these disks is the initial flow already described.

As the land moves in the opposite direction, the openings in the center of the disks which are exposed become exit channels for return flow from the hydraulic motor. The flow is therefore in the opposite direction from that described above. Movement past disk 160 opens only the slot communicating with the inside of the disk in group 166, but this slot also communicates with registering slots in disks 150, 148, 134, 112 nd the deep slot in disk 110 which communicates with the first orifice from the center in orifice group 126. This will permit return flow in exactly the same pattern to that described above but in the opposite direction. Flow will enter the outside openings in group 102 of disk 96 and the corresponding openings in disk 110, flow through the outside orifice of orifice group 126 and from thence into the chamber defined by the outside opening of group 144 of disk 134 and corresponding openings in disks 148, 150 and 160. Flow passing to the inside of this chamber will enter the third orifice of group 126 from whence it flows into the chamber defined by the center opening of group 102 of disk 96 and the corresponding openings in disks 74, 86 and 110. This disk also communicates with the second (from the inside) orifice of group 126, thereby communicating with the chamber consisting of the center opening of group 144 in disk 134 and the corresponding openings in disks 148, 150 and 160. The inside portion of this chamber communicates with the inside orifice of group 126 which communicates with the elongated slot forming the inside opening of openings 102 in disk 96 and the corresponding openings in disk 110.

Further movement of the land past disk 150 provides additional area for the flow just described from the inside opening of group 156 and also exposes an inside opening of the group 158 which communicates with registering openings in disks 148, 134, 112 and the elongated openings at this position in disk 110 and disk 96. This opens a flow pattern from the outside opening of group 104 of disk 96 and the corresponding opening in disk 110 which communicates with the outside orifice of orifice group 130, through this orifice into a chamber defined by the outside opening of group 146 of disk 134 and the corresponding openings in disks 148, 150 and 160. Flow from this chamber then crosses the third (from the inside) orifice of orifice group 130 entering the chamber defined by the center of openings 104 in disk 96 and the corresponding openings in disks 110, 86 and 74. Flow in this chamber then exits through the second of the orifices 130 into a chamber defined by the middle opening of openings 146 in disk 134 and corresponding openings in disks 148, 150 and 160 from whence it flows to the inside orifice 130 and from thence to the deep notch at the inside of group 104 of orifice 96 and its counterpart in disk 110. This flow then augments that which was initiated by the movement of the land past disk 160.

Further movement of the land past disk 148 exposes a set of openings in this disk which register exactly with openings 156 and 158 in disk 160, these openings simply being part of the passageways and flow patterns just described. Also exposed are the large slots in disk 148 which register with slots 140 and 142 in disk 134 and the other slots previously described to provide a large flow across the stack. At the 12 o'clock and 6 o'clock positions of disks 148 and 134 are deep slots intersecting the inside edges of these disks and which communicate with the inside orifices of orifice groups 118 and 122 of disk 112 (see FIG. 16). The opposite side of these orifices communicates with the center opening in the vertically oriented openings of disk 110, opening groups 98 and 100 of disk 96 and corresponding openings in disks 86 and 74. This chamber also communicates with the second of orifices 118, and the corresponding chamber communicates with the second of orifices 122 and from thence with the chambers defined by center openings 136 and 138 of disk 134 and the corresponding openings in disks 148, 150 and 160. These chambers, in turn, communicate with the third of the orifices 118 and 122 which, in turn, connect with a chamber defined by the outside openings of groups 98 and 100 of disk 96 and the corresponding openings of disks 110 and 86 and 74. The outside of orifices 118 and 122 provides communication between this last-mentioned chamber and the outside notches of groups 136 and 138 in disk 134 and corresponding outside notches of disks 148, 150 and 160. This arrangement permits flow into the outside notches, across the outside of the orifices 118 and 122 and through the various chambers and orifices described, the flow exiting through the inside of orifices 118 and 122 into the elongated slots at the center positions of groups 136 and 138. It will be recognized that this flow pattern serves to effectively backwash the orifices in groups 118 and 122 across which flow is normally in the opposite direction as described above.

FIGS. 1 through 5 show, in addition to the stack described above, a second stack across which the flow patterns are directly analogous to that described above. The principal patterns and directions of flow have been described in connection with FIGS. 2 through 5, and it is believed that those skilled in the art will recognize that the arrangement for the second stack is essentially a mirror image of that described. And if the second increment of flow as represented by the curve b of FIG. 15 is not required, slots like those at numerals 106 and 108 of disk 96 may also be formed in disks 86 and 150. Alternatively, if an additional increment is desired or required before the major flow begins, the large slots could be removed from disks 96 and 148. Depending upon the travel of the spool valve and the volume of flow required, more or fewer disks having the large slots may be included.

A second embodiment of my invention is shown in connection with the disks shown in FIGS. 17 through 21. In the application for which this embodiment was designed, it was found that curtailing the flow only to the extent of approximately one disk thickness was sufficient to avoid excessive wear of the sppl and sleeve of the servo valve.

Referring now to FIGS. 17 through 21, these disks are typically of 0.004 or 0.005 inch thickness. While five such disks are shown, more may be used in an actual installation to match the stack with the width of the land. For example, in one installation with which applicant was concerned, each stack consisted of one each of the disks of FIGS. 17, 19 and 21 and two each of the disks of FIGS. 18 and 20 arranged side by side.

Assuming now that the disks shown in FIGS. 17 through 21 are arranged in a stack such as that shown at numeral 52 of FIG. 1 and that this stack is initially covered by land 36, the subsequent movement of land 36 one disk width toward the right would permit high pressure fluid in the chamber 32 to flow into the stack through a pair of openings 262 in disk 260 which communicate with orifices 266 in disk 264 (FIG. 12). Orifices 266 communicate with a chamber defined by openings 268 in disk 270 and opening 272 in disk 274. This chamber, in turn, also communicates with an orifice 276 leading to a chamber defined by orifices 278 and 280 in disks 260 and 282. This chamber also communicates with an orifice 284 in orifice plate 264 affording communication with a chamber defined by openings 286 and 288 in disks 270 and 274, respectively. The opposite end of this chamber communicates through an orifice 290 with chambers defined by openings 292 and 294 in disks 260 and 282. From thence, flow passes through an orifice 296 into the outlet passage consisting of slots 298 and 300 in disks 270 and 274, respectively.

Assuming an identical set of disks to be located in FIG. 1 at numeral 50 and these disks to be exactly covered by land 34, movement of land 34 to the left would expose disk 274 in its first 0.005 inch of travel. This would permit flow to enter into the stack through openings 302, and this flow is then immediately communicated with orifices 304 of the orifice plate 264. These orifices communicate with a chamber defined by openings 306 and 308 in disks 260 and 282, respectively. Flow crossing the chamber defined by openings 306 and 308 passes through an orifice 312 into the chambers defined by openings 314 and 316 in disks 270 and 274. This flow is, in turn, directed across the orifice 318 into a chamber defined by openings 320 and 322, from thence across orifice 324 to a chamber defined by openings 326 and 328, from thence across orifice 330 into the exit slot formed by openings 332 and 334. Thus, the flow pattern is entirely analogous to that previously described and permits a very limited flow for the first 0.005 inch of travel, after which travel the flow proceeds essentially linearly and at a very steep rate until reaching an effective saturation value. As the land 34 moves farther to the left, it will uncover progressively openings 336 of disk 270, 338 of disk 264, and 340 of disk 282. Since these openings communicate with large exit slots 342, 344 and 346, respectively, the flow increases steeply to saturation.

In some applications there may be concern that operation of the valve may be interfered with through plugging or partial obturation of the orifices. This may be alleviated through a backwashing arrangement which causes a reverse flow across some or all of the orifices in some modes of operation. In a stack such as that using the disks of FIGS. 17 to 21, a backwashing arrangement may be included by making additional openings into the stack in disk 282 by cutting a path from openings 308 to the center and from openings 268 of disk 270 to the center as shown in FIGS. 18A and 20A. With this arrangement, when the land 36 is moved to the left sufficiently to uncover disk or disks 270, for example, return pressure entering exterior openings 298 and 300 follows a path through orifice 296, the chamber defined by openings 292 and 294, orifice 290, the chamber defined by openings 286 and 288, orifice 284, the chamber defined by openings 278 and 280, through orifice 276 and into the chamber defined by openings 268 and 272, and from thence to chamber 38. Movement of the valve member 22 in the opposite direction results in moving land 34 to the right with an analogous flow pattern into openings 332 and 334 and out of the chamber defined by openings 308 into chamber 42. The openings and orifices may trace an arcuate or doubled over pattern on the disks, or by increasing the width of the disks, or both, larger numbers of orifices may be used to deal with greater pressure drops or to provide quieter operation.

We claim:

1. In a flow control valve wherein a spool valve member is movable within a sleeve to open and close fluid passageways in said valve, a rigid structure forming part of said sleeve for dividing the flow entering and leaving said passageways into a plurality of streams comprising a stack of laminar disks having abutting faces and internal edge surfaces adjacent lands of said spool member;

said stack of disks including first flow paths and second flow paths across said stack entering said stack at each end thereof, said flow paths comprising a series of chambers connected to each other through first and second series of orifices, thereby providing restricted flow and substantial pressure drop across each of said orifices, and a third flow path in parallel with said first flow paths offering much less restriction to flow, said stack including a first group of disks at its outside edges each of which includes at least one opening at an internal edge surface thereof communicating with said first flow path;

a second group of disks adjacent said first group having a pattern of openings in registry with openings in said first group communicating with said first series of orifices plus other openings including at least one additional opening at an internal edge surface communicating with said second series of orifices;

a third group of disks adjacent said second group, each of which includes an opening at an internal edge surface opening into a slot extending to the outside edge of said stack, thereby providing at least a part of said third flow path;

and an orifice disk interposed between disks of said third group including said series of orifices communicating with chambers formed by the openings in the disks of said first, second and third groups, said orifice disk also having openings at its internal edge surface communicating with registering internal edge openings in said second and third groups of disks, at least some of said orifices being radially aligned with said internal edge openings in said orifice disk, such that an initial increment of movement of said valve member in either direction away from null causes flow to be directed through said first flow path and further movement causes flow to be directed through said second flow path and said third flow path.

2. A flow control valve as set forth in claim 1 wherein disks of said third group adjacent said orifice disk include elongated openings on internal edge surfaces thereof each of which communicates directly with an orifice of one of said series of orifices.

3. A flow control valve as set forth in claim 2 wherein said orifice disk includes first and second series of orifices corresponding to said first and second flow paths entering said stack at one end, and third and forth series of orifices corresponding to said first and second flow paths entering said stack at the opposite end.

4. A flow control valve as set forth in claim 1 wherein disks of said third group on each side of said orifice disk have elongated openings communicating said first and second flow paths fron the opposite sides of said orifice disk, said elongated openings on opposite sides of said orifice disk, being radially disaligned.

5. In a flow control valve wherein a spool valve member is movable within a sleeve to open and close fluid passageways in said valve, a rigid structure forming part of said sleeve for dividing the flow entering and leaving said passageways into a plurality of streams comprising a stack of laminar disks having abutting faces and internal edge surfaces adjacent lands of said spool member, said stack of disks including a first flow path across said stack, said first path including a first series of chambers connected to each other through a first series of orifices, thereby providing restricted flow in an inside to outside direction and substantial pressure drop across each of said orifices;

a second flow path across said stack, said second path including a second series of chambers connected to each other through a second series of orifices, thereby providing restricted flow in an outside to inside direction and substantial pressure drop across each of said second series of orifices;

a third flow path across said stack directing a backflushing flow across said first series of orifices; and a fourth flow path across said stack directing a backflushing flow across said second series of orifices, movement of said adjacent land a small increment from null in a first direction opening said first flow path and further movement in said first direction opening said fourth flow path, and movement of said land a small increment from null in a second direction opening said second path and further movement in said second direction opening said third flow path.

6. A flow control valve as set forth in claim 5 wherein said stack of disks includes a fifth flow path across said stack, said path including a third series of chambers connected to each other through a third series of orifices, thereby providing restricted flow in said inside to outside direction across said third series of orifices;

a sixth flow path across said stack, said path including a fourth series of chambers connected to each other through a fourth series of orifices thereby providing restricted flow in said outside to inside direction across said fourth series of orifices;

a seventh flow path across said stack directing a backflushing flow across said third series of orifices and an eighth flow path across said stack directing a backflushing flow across said fourth series of orifices, and movement of said adjacent land a second small increment from null in said first direction opens said fifth flow path, movement of said land a second small increment from null in said second direction opens said sixth flow path, and movement of said land a further increment in either direction opens one of said one of said seventh and eighth paths to backflushing flow.

7. A flow control valve as set forth in claim 5 wherein movement of said land in either direction beyond said first increment opens a large area flow path.

8. In a flow control valve wherein a spool valve member is movable within a sleeve to open and close fluid passageways in said valve, a rigid structure forming part of said sleeve for dividing the flow entering and leaving said passageways into a plurality of streams comprising a stack of laminar disks having abutting faces and internal edge surfaces adjacent said spool member, said stack of disks including a first group of disks each of which has a pattern of openings therethrough including at least one opening at its internal edge surface, a second group of disks having a pattern of openings including an internal edge openings and other openings in registry with corresponding openings of said first group plus an additional internal edge opening, a third group of disks communicating with the openings in said first and second disks and having a large slot extending from the inside to the outside edges thereof, one of said second and third groups of disks having a plurality of series of orifices therethrough, said orifice disk having at least one opening at an internal edge surface thereof in registry with internal edge surface openings of others of said disks, said opening being radially aligned with at least one orifice of one of said series of orifices, said stack being aligned with at least one land of said spool valve member when said member is in null position such that flow through said stack is blocked and when said land is moved an initial increment from null in a first direction flow is directed in a first path through said internal edge opening of one of said first group of disks, through one of said series of orifices to a chamber defined by registering openings in the other of said first group of disks and the adjacent disk of said second group, across another of said series of orifices to a chamber defined by registering openings in the first of said first and second group of disks and continuing from orifice to chamber until flow passes through an orifice into an outlet passage formed by an opening in an external edge surface of at least one of said disks, and when said land is moved an additional increment, additional flow is directed in a second path through an internal edge opening of at least one of said second group of disks, through one of a second of said series of orifices to a chamber defined by other registering openings in the other of said first and second groups of disks, across another of said second series of orifices to a chamber defined by other registering openings in the first of said second group of disks and continuing from orifice to chamber until flow passes through an orifice into an outlet passage formed by at least one opening in an external edge surface of two of said disks, and also through a large opening in parallel with the flow through said orifices.

9. A flow control valve as set forth in claim 8 in which each of the disks of said second group includes a large slot extending from inside to outside edges thereof, the slots of the disks of said second and third groups of disks being in registry.

10. A flow control valve as set forth in claim 8 wherein movement of said land an initial increment from null in a second direction permits flow from outside said stack through said second path in the opposite direction, and movement of said land an additional increment opens said first path for flow in the opposite direction, whereby each of said series of orifices is backflushed when said land is moved in each direction an amount equal to said additional increment.

11. In a flow control valve wherein a spool valve member is movable within a sleeve to open and close fluid passageways in said valve, a rigid structure forming part of said sleeve for dividing the flow entering and leaving said passageways into a plurality of streams comprising a stack of laminar disks having abutting faces and internal edge surfaces adjacent lands of said spool member;

said stack of disks including first flow paths and second flow paths across said stack entering said stack at each end thereof, said flow paths comprising a series of chambers connected to each other through first and second series of orifices, thereby providing restricted flow and substantial pressure drop across each of said orifices, and a third flow path in parallel with said first flow paths offering much less restriction to flow, said stack including a first group of disks at its outside edges each of which includes at least one opening at an internal edge surface thereof communicating with said first flow path;

a second group of disks adjacent said first group having a pattern of openings in registry with openings in said first group communicating with said first series of orifices plus other openings including at least one additional opening at an internal edge surface communicating with said second series of orifices;

a third group of disks adjacent said second group, each of which includes an opening at an internal edge surface opening into a slot extending to the outside edge of said stack, thereby providing at least a part of said third flow path;

means including said series of orifices communicating with chambers formed by the openings in the disks of said first, second and third groups, such that an initial increment of movement of said valve member in either direction away from null causes flow to be directed through said first flow path and further movement causes flow to be directed through said second flow path and said third flow path.

12. A flow control valve as set forth in claim 11 wherein at least one of said third group of disks includes said series of orifices communicating with chambers formed by openings in the disks of said first and second groups.

13. A flow control valve as set forth in claim 11 wherein said stack comprises, in order, a disk of said first group, a disk of said second group, first, second and third disks of said third group, said third disk of said third group including said orifices, fourth and fifth disks of said third group, a second disk of said second group, and a second disk of said first group such that an initial increment of movement of said valve member from null produces a first restricted increment of flow, a second increment of movement of said valve member produces a second restricted increment of flow and a third increment of movement of said valve member produces a rapidly increasing increment of flow in parallel with said restricted increments of flow.

* * * * *